H. W. PLEISTER.
CONDUIT OR CABLE CLAMP AND BRIDLE RING.
APPLICATION FILED JAN. 23, 1920.
1,365,632.
Patented Jan. 11, 1921.
2 SHEETS—SHEET 2.
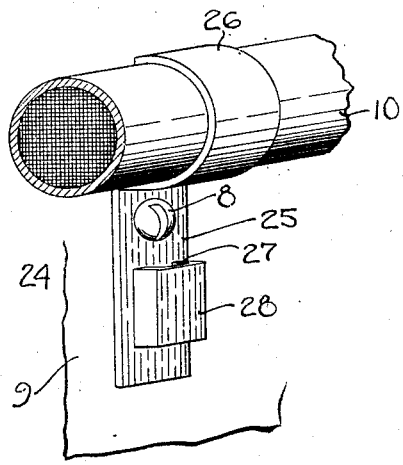
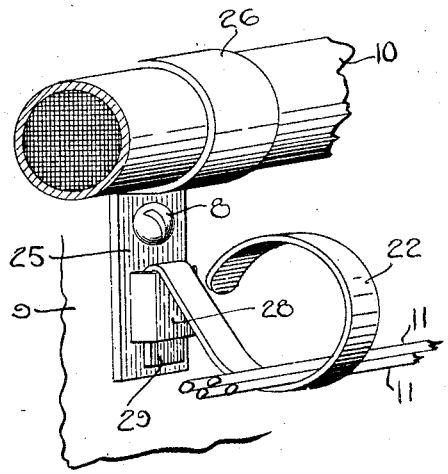
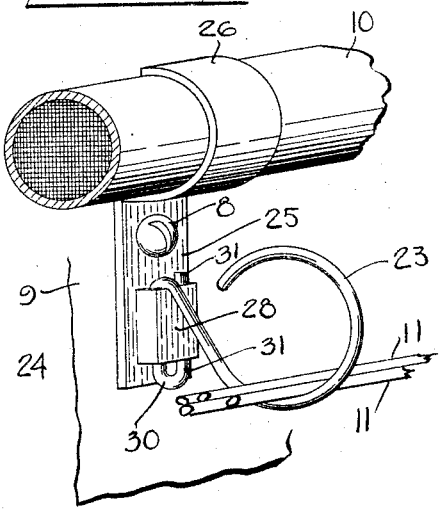
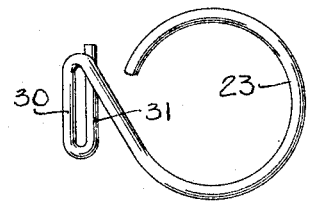
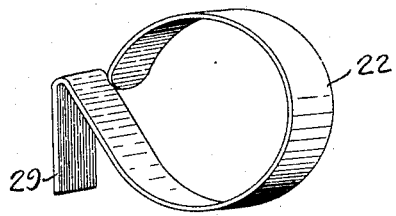
INVENTOR
Henry W. Pleister
BY
Clark Johnson
ATTORNEY

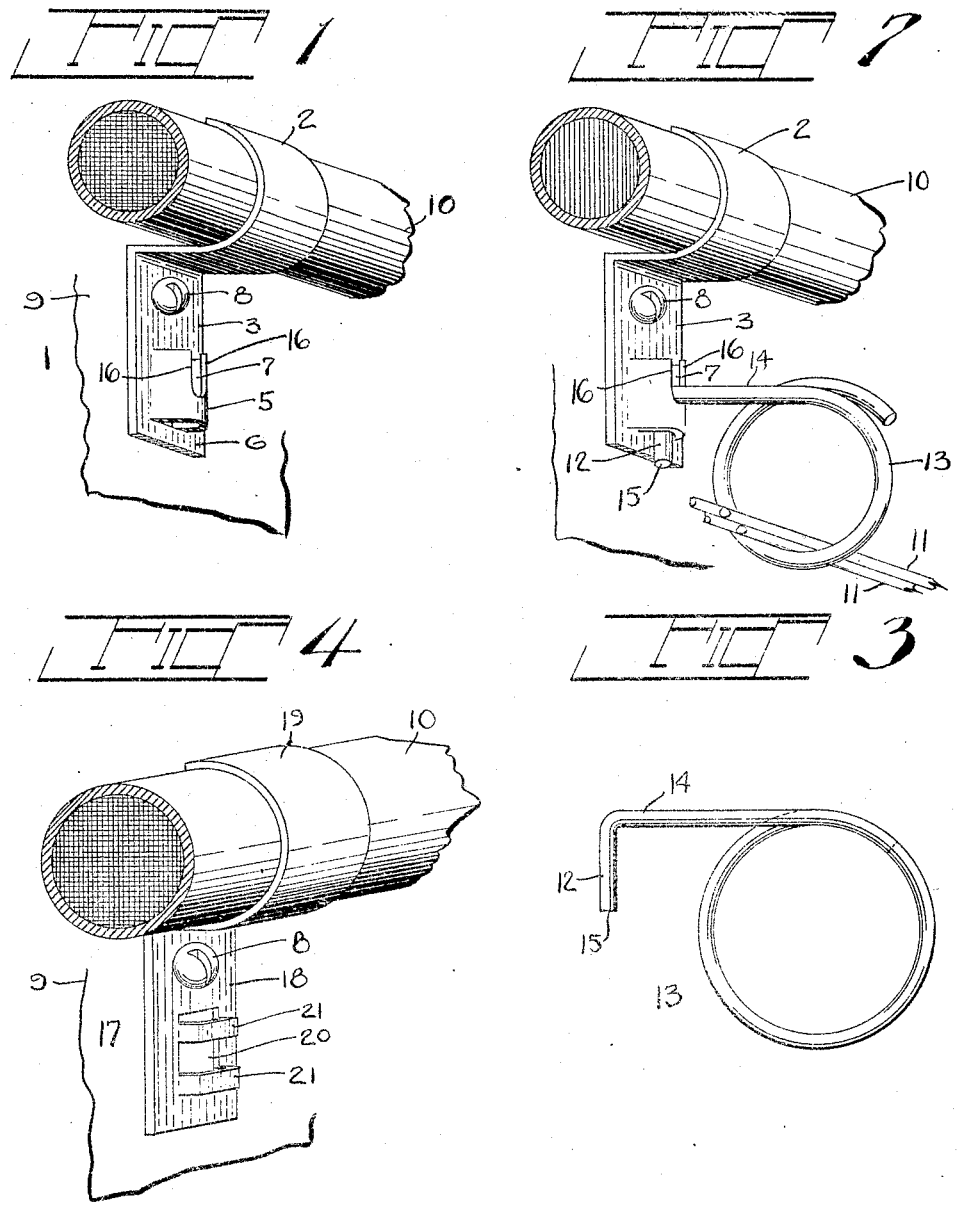

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,365,632. Specification of Letters Patent. Patented Jan. 11, 1921.

Application filed January 23, 1920. Serial No. 353,624.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a socket or recess to receive the shank of either a flat bridle ring, or the shank of a wire bridle ring, which has preferably, though not necessarily, been properly bent upon itself to form a U-shaped member. Such a member serves to fill the socket or recess and prevents rattling.

My invention further relates to different forms of pig tail bridle rings which are used with my improved conduit or cable clamp.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures in which I have shown different embodiments of my invention, the same reference numerals refer to similar parts in the several figures.

Figure 1 is a perspective view of my conduit or cable clamp and a cable which it supports;

Fig. 2 is a perspective view similar to Fig. 1 but with the addition of a pig tail bridle ring;

Fig. 3 is a detail perspective view of the pig tail bridle ring shown in Fig. 2;

Fig. 4 is a perspective view of a modified form of conduit or cable clamp;

Fig. 5 is a perspective view of still another modified form of conduit or cable clamp;

Fig. 6 is a perspective view of the conduit or cable clamp shown in Fig. 5 with the addition of a flat pig tail bridle ring;

Fig. 7 is a perspective view of the clamp shown in Fig. 5 but with a different form of bridle ring;

Fig. 8 is a detail perspective view of the bridle ring shown in Fig. 7;

Fig. 9 is a detail perspective view of the bridle ring shown in Fig. 6.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I form my conduit or cable clamp 1 with a hook portion 2 and a base 3. Preferably, though not necessarily this conduit or cable clamp is formed of pressed sheet metal. Near the bottom 4 of the base I form an integral socket or recess 5 running parallel to the longitudinal axis of the conduit or cable clamp 1. This socket, when the clamp is made of sheet metal, is preferably struck up. Preferably the portion 6 of the base is not bent and serves as a bearing or abutment for the end of the bridle ring. I preferably provide the socket or recess 5 with a slot 7 extending longitudinally of the conduit or cable clamp.

In use the screw 8 serves to hold the conduit or cable clamp with the cable 10 to the wall or other suitable support 9.

Should the capacity of the cable 10 prove insufficient, in the course of time, to carry the increased traffic, and it is not deemed economical or expedient to take down this cable and install a new one of greater capacity, the original installation can, at minimum expense, be greatly augmented by stringing runs of bridle wires 11, 11 to accommodate the increased traffic load.

By my invention the shank 12 of the bridle ring 13 is dropped into the socket or recess 5, the arm 14 moving down the slot 7. When the parts are positioned as shown in Fig. 2 the end 15 of the shank 12 bears upon the portion 6 of the base 3. This gives a firm support for the pig tail bridle ring 13, the sides 16, 16 of the slot 7 preventing all but a very limited rocking of the shank 12 in the socket or recess 5.

Should it ever be desirable to remove the bridle wires 11, 11 and the bridle ring 13 this can be easily done, without disturbing the screw 8, by simply lifting the shank 12 free of the socket or recess 5.

In some cases I may form my conduit or cable clamp 17, Fig. 4, with a base 18 and a hook portion 19. In this modification I form a socket or recess 20 by striking up the two straps 21, 21, the socket, in this form being preferably angular in cross section to coöperate with a flat pig tail bridle ring 22, Fig. 9, or with a wire pig tail bridle ring 23, Fig. 8.

I may form my conduit or cable clamp 24, Fig. 5, with a base 25 and a hook portion 26, the base being provided with a pocket or recess 27 formed by striking up an angular hollow box shaped boss 28.

In this form of my invention the flat shank 29 of the flat pig tail bridle ring 22 snugly fits so that there is no rattling or movement between the bridle ring and the conduit or cable clamp after they have been once assembled, Fig. 6.

Instead of employing a flat pig tail bridle ring, I may, with the same conduit or cable clamp 24, use a wire pig tail bridle ring 23, Fig. 8. This bridle ring has its wire shank 30 bent back on itself 31 to form an enlarged and stronger shank and one which will snugly fill the angular recess 27 in the box shaped boss 28, Fig. 7. By this simple construction I am enabled to use either a flat pig tail bridle ring 22 or a wire pig tail bridle ring 23 with either the clamps 24, Figs. 5, 6, and 7, or 17, Fig. 4. In neither form will there be any movement or rattling of the parts after being assembled. To disengage the bridle rings it is necessary simply to lift their respective shanks out of the sockets or recesses.

In the wire pig tail bridle ring 23, I preferably though not necessarily, form the bends 30 and 31 so that they are compressed very slightly when inserted in the recess or socket in the clamp. Should any of the sockets not be true, the arms 30 and 31 will be compressed to fit a comparatively small recess, and, by bending out the end 31, if necessary, the shank can be made to fit snugly a comparatively large recess.

It will be noted that in no one of my improved constructions is it necessary to tap or screwthread the conduit or cable clamp; nor is it necessary to place screwthreads upon any of the different forms of pig tail bridle rings. This of course saves considerable expense in the manufacture of the article and reduces the amount of metal necessary to make the conduit or cable clamp.

Having thus described this invention in connection with illustrative embodiments thereof, to the details of which I do not desire to be limited, what is claimed as new and what is desired to secure by Letters Patent is set forth in the appended claims.

What I claim is:—

1. The combination of a conduit or cable clamp provided with a hook portion to receive and support a cable or conduit, and a base adapted to lie against a wall or other suitable support, means to fasten the clamp to the wall, a longitudinally extending struck up pocket or recess to permit a bridle ring to detachably hook into said pocket without disturbing the fastening means, and a bridle ring having a hook or shank to detachably hook into said pocket or recess.

2. The combination of a conduit or cable clamp provided with a hook portion to receive and support a cable or conduit and a base adapted to lie against a wall or other suitable support, means to fasten the clamp to the wall, a longitudinally extending pocket or recess provided with a longitudinally extending slot to permit a bridle ring to detachably hook into said pocket and slot without disturbing the fastening means, and a bridle ring having a hook or shank to detachably hook into said pocket or recess and said longitudinally extending slot.

3. The combination of a conduit or cable clamp provided with a hook portion and a base, with coöperating locking surfaces adapted to receive a bridle ring inserted in a direction parallel to the longitudinal axis of the clamp and a bridle ring to coöperate with said locking surfaces.

HENRY W. PLEISTER.

Witnesses:
MARY R. RYAN,
A. M. WILLIAMS.